United States Patent Office 3,734,894
Patented May 22, 1973

3,734,894
METHOD OF CONTROLLING REACTION OF POLYISOCYANATE WITH POLYAMINE
Anthony F. Finelli and James C. West, Akron, Ohio, assignors to The Goodyear Tire & Rubber Company, Akron, Ohio.
No Drawing. Continuation of abandoned application Ser. No. 857,616, Aug. 27, 1969, which is a continuation of abandoned application Ser. No. 467,115, June 25, 1965. This application July 1, 1971, Ser. No. 159,045
Int. Cl. C08g 22/02, 22/18
U.S. Cl. 260—32.8 N                    2 Claims

ABSTRACT OF THE DISCLOSURE

This invention relates to a method of making polyurethane having improved resistance to discoloration, for instance, in a weatherometer for 100 hours. These polyurethanes are prepared by reacting a reactive hydrogen containing material such as polyesters, polyethers, polyester amides, castor oil, polycarbonate polyols and polydiene polyols and the hydrogenated polydiene polyols with a nonaromatic organic polyisocyanate and a nonaromatic primary diamine in the presence of sufficient inert solvent to render the mixture spreadable.

---

This application is a streamline continuation application of Ser. No. 857,616, filed Aug. 27, 1969, which is a streamline continuation application of Ser. No. 467,115, filed June 25, 1965, both now abandoned.

This invention relates to a method of making polyurethanes having improved resistance to discoloration after 100 hours in the weatherometer and to the resulting product.

Although polyurethanes have been known for at least two decades and the early workers taught that polyurethane films could be made, these films have not achieved commercial significance or at least large volume sales because of the tendency of polyurethanes to discolor and eventually become dark brown to shades of black upon exposure to sunlight. This is an impediment particularly to commercial development where white or brightly colored film or other polyurethane objects are desired.

Therefore an object of this invention is to provide a method of making polyurethanes having improved resistance to discoloration.

This object may be accomplished by preparing a polyurethane reaction mixture comprising (1) a reactive hydrogen containing material having a molecular weight of at least about 500 and no more than about 6000, (2) an organic polyisocyanate having all the isocyanate groups atached to non-benzenoid carbon atoms, (3) a non-aromatic primary diamine, said polyisocyanate and said diamine being so selected that the reaction between them in boiling methylene chloride of 0.2 to 0.5 molar concentration causes a turbidity inside of 30 seconds. For these polyurethane reaction mixtures to be spreadable, it is desirable that they contain a suitable inert solvent. These spreadable polyurethane reaction mixtures can be brushed, dipped, sprayed or otherwise applied to a suitable shaping surface to obtain a film, fabricated articles and related shaped polyurethanes which have improved resistance to discoloration after 100 hours in the weatherometer as determined by ASTM method E42–57 and ASTMD–1499–59T.

The spreadability of these polyurethane reaction mixtures is best assured where the reaction mixture comprises (1) a reactive hydrogen containing material having a molecular weight of about 900 to 3000, (2) a non-aromatic organic polyisocyanate, (3) a non-aromatic primary diamine, and (4) sufficient inert solvent to render the mixture spreadable.

Preferred results are obtained when the reactive hydrogen containing material is first reacted with an organic polyisocyanate having all the isocyanate groups attached to non-benzenoid carbon atoms and then the non-aromatic primary diamine is added to the resulting reaction product. Since the non-aromatic organic polyisocyanates and non-aromatic primary diamines utilized develop a turbidity according to the Müller hot methylene chloride test described in U.S. 2,620,516, it has been discovered that a particularly useful technique for improving and for prolonging the spreadability of the polyurethane reaction mixture is to heat the organic diamine with a ketone selected from the class consisting of acetone and methyl ethyl ketone. Thus, these ketones may be utilized as a part or all of the solvent in making polyurethane reaction mixtures which remain spreadable for a longer time.

The reactive hydrogen containing materials useful in this invention have a molecular weight of at least about 500 and no more than about 6000. Where elastomeric materials are desired, the molecular weight should be about 1000 and preferably no higher than about 3000.

Representative classes of reactive hydrogen containing materials are the polyester polyols, polyether polyols, polyether-polyester polyols, polyester amides, castor oil, polycarbonate polyols and polydiene polyols and the hydrogenated polydiene polyols.

Representative examples of these reactive hydrogen containing materials are shown in the following U.S. patent applications: Ser. No. 274,280, filed Apr. 19, 1963, now abandoned, Ser. No. 310,910, filed Sept. 23, 1963 and Ser. No. 410,003, filed Nov. 9, 1964, now U.S. Pat. No. 3,312,653. Some specific polyester diols are the alkylene adipates where the alkylene radical is ethylene, propylene, butylene, amylene and hexylene or mixtures thereof. The corresponding alkylene azelates are desired where low temperature properties are required. The (polyakyl ether) glycols or triols are preferred where the alkyl radical is propyl and butyl.

Representative of the organic polyisocyanates having all the isocyanate groups attached to non-benzenoid carbon atoms which are useful in this invention are m-xylylene diisocyanate, 4,4'-methylene bis (cyclohexyl isocyanate), p-menthane diisocyanate, bis(2-isocyanatoethyl) fumarate, bis(2-isocyanatoethyl) carbonate, bis(2-isocyanatoethyl)4-cyclohexene - 1,2 - dicarboxylate and hexamethylene diisocyanate, 1-methyl cyclohexyl-2,4-diisocyanate, 1 methyl cyclohexyl-2,6-diisocyanate and mixtures of 1-methyl-cyclohexyl 2,4-diisocyanate and 1 methyl cyclohexyl-2,6-diisocyanate.

Representative of the non-aromatic primary diamines are 1,4-cyclohexane bis(methylamine), p-menthane diamine, 1,6-hexamethylene diamine, trans - 1,2 - cyclobutane bis(methylamine), 1 - methyl cyclohexyl-2,4-diamine, diamino cyclopentane and ethylene diamine.

Although the polyurethane reaction mixtures may be made by simultaneously mixing the reactive hydrogen containing material, the organic polyisocyanate and the diamine, it is preferred that the reactive hydrogen containing material and the organic polyisocyanate be first reacted to give a prepolymer and then the diamine be added. Also, it has been observed that about 1.3 to 3 mols of organic polyisocyanate may be used for each mol of reactive hydrogen containing material although slightly lower and higher ratios may be utilized but it has been observed that the resulting physical properties of the cured product are not as satisfactory as those obtained at the above ratios. The amount of diamines used should be about .5 to 1 mol for each mol of free isocyanate present.

This is especially true where the final cure and shaping of the reaction mixture is to be carried out at room temperature although it has been found that .7 to about 1.2 mols of diamine for each mol of free isocyanate may be utilized and it should be appreciated that the use of catalysts such as the well-known organic tin catalyst will affect the ratio and ultimate physical properties obtained where the reaction is carried out at room temperature or at temperatures up to about 150° C. It should be emphasized that the use of catalysts such as the organic tin catalysts have a tendency to effect the aging properties of the resulting polyurethane. Other catalysts such as the well-known tertiary amines may be utilized.

It should be emphasized that where the amount of diamine utilized is essentially equivalent to the free isocyanate that the physical properties of the cured material will usually be in the neighborhood of 4000 pounds per square inch tensile or higher whereas at the extreme ranges of diamine to free isocyanate quoted above the tensile properties may be no higher than about 1200 pounds per square inch.

The polyurethane reaction mixtures of this invention are essentially non-discoloring after exposure for a hundred hours in a weatherometer. Thus, especially valuable results are obtained when the polyurethane reaction mixture contains various pigments, usually in the ratio of about 5 to 100 parts per hundred parts of said reaction mixture. Normally, about 5 to 20 parts of pigment will be sufficient to give the desired aesthetic effect. It should be emphasized that the well-known inorganic pigments such as titanium oxide, lead sulfate, chrome yellows, rouge and other pigments of the inorganic type may be utilized in this invention. Similarly, the organic pigments such as the resorcinol greens, indigo, turkey red, triphenyl methane dyes, xanthene dyes, the stilbene and other dyes such as those listed in William T. Caldwell's book on organic chemistry, copyrighted in 1943, Riverside Press, starting at page 702 through page 725 may be used, too.

Our invention is illustrated but not limited by the following examples in which the parts and percentages are by weight unless otherwise stated.

EXAMPLE I

A prepolymer was prepared from 8000 parts of 80 ethylene 20 propylene adipate having a reactive number of 62 and 2352 parts of 4,4'-diisocyanatodicyclohexyl methane in the following manner:

The polyester was degassed under vacuum at 76–100° C. for one hour. The molten diisocyanate (mixture of cis and trans forms) was then added and allowed to react at 90–114° C. for one hour. Vacuum was then applied slowly (to prevent vigorous frothing) over a period of one hour. The prepolymer then showed 3.5% isocyanate content.

The prepolymer was diluted as follows:

| | Parts |
|---|---|
| Prepolymer | 100 |
| Methyl ethyl ketone | 30 |
| Toluene | 30 |
| Cellulose acetate butyrate solution (10% in Cellosolve acetate) | 5 |
| | 165 |

The diluted prepolymer showed 2.0% isocyanate content (percent NCO). The diluted prepolymers are hereinafter referred to as Component A.

To forty parts of Component A was added fifteen parts of p-xylene. A curative solution A was prepared by heating 1.5 parts 1,4-cyclohexane-bis(methylamine), 2 parts N,N'-dimethylformamide and 3 parts methyl ethyl ketone. The curative solution was added to the diluted prepolymer and used to coat strips of naval officer's gold braid. Films were also drawn on polyethylene slabs and allowed to room temperature cure.

The clear film exhibited 3200 pounds per square inch tensile and 620 percent elongation on room temperature cure. The clear film (.014 inch) showed negligible discoloration after 100 hours in the weatherometer.

A white diluted prepolymer was prepared from 165 parts of Component A and 15 parts of titanium dioxide. The mix was ball-milled for twenty hours.

To forty parts of the above white diluted prepolymer, there was added with good mixing 4.8 parts of curative solution B and 10 parts of methyl ethyl ketone. The curative solution B was prepared by heating 100 parts of 1,4-cyclohexane-bis(methylamine) and 400 parts methyl ethyl ketone. White sheets were prepared by spraying. The sheet showed 2100 pounds per square inch tensile and 590 percent elongation on room temperature cure. After 100 hours in a weatherometer there was negligible discoloration.

EXAMPLE II

A prepolymer was prepared from 400 parts of 80 ethylene 20 propylene adipate having a reactive number of 62 and 85 parts of meta-xylylene diisocyanate in the following manner:

The polyester was degassed under vacuum at 200–225° F. for thirty minutes, then magnesium oxide (0.2 part) was added. Degassing was continued for another twenty-five minutes. The m-xylylene diisocyanate was added and reacted at 190–210° F. for 45 minutes. Vacuum was then applied and the mixture degassed for fifteen minutes. The prepolymer showed 3.1 percent isocyanate content.

It was diluted as follows:

| | Parts |
|---|---|
| Prepolymer | 150 |
| Methyl ethyl ketone | 45 |
| Cellosolve acetate | 45 |
| Cellulose acetate butyrate solution (10% in Cellosolve acetate) | 8 |
| Titanium dioxide | 30 | and then was ball-milled for 16 hours to give a diluted white prepolymer C.

To twenty-five parts of the diluted white prepolymer C was added a solution of 0.5 part of 1,4-cyclohexane bis (methylamine) in five parts of methyl ethyl ketone. The mix set rapidly and was spread on a polyethylene slab. Three days later it was a strong white rubber. It showed negligible discoloration after 100 hours in a weatherometer.

EXAMPLE III

Fifty parts of a clear diluted prepolymer prepared according to the procedure of Example I, was treated with a solution of 1.0 part trans-cyclobutane-1,2-bis-(methylamine) in 10 parts of methyl ethyl ketone. There was ample pot life for drawing two films on a polyethylene slab. The sheets were tack-free in 25 minutes at room temperature and strippable within one hour.

The clear film exhibited 2100 pounds per square inch tensile and 560 percent elongation. After 100 hours in the weatherometer the clear film showed negligible discoloration.

EXAMPLE IV

To 50 parts of clear diluted prepolymer from Example I was added 10 parts of a white masterbatch A prepared from 60 parts titanium dioxide and 40 parts of polyester of Example I. To the diluted white prepolymer was added a mixture of 1.0 part transcyclobutane-1,2-bis-methylamine) in 10 parts methyl ethyl ketone. After stirring well, a white film was drawn on a polyethylene slab. The film was tack-free in 10 minutes at room temperature and strippable from the polyethylene slab in 20 minutes. There was negligible discoloration after 100 hours in the weatherometer.

EXAMPLE V

A prepolymer was prepared from one mole ethylene adipate (1000 M.W.) and two moles of 4,4'-diisocyanatodicyclohexyl methane. This showed 5.1 percent isocyanate content (percent NCO).

The prepolymer was diluted as follows:

| | Parts |
|---|---|
| Prepolymer | 100 |
| Methyl ethyl ketone | 30 |
| Toluene | 30 |
| Cellulose acetate butyrate solution (10% in Cellosolve acetate) | 5 |

To fifty-five parts of diluted prepolymer was added 8 parts of white masterbatch A. Then was added 11 parts of curative solution B. After mixing well, films were drawn and allowed to cure at room temperature. The sample showed negligible discoloration after 100 hours in the weatherometer.

EXAMPLE VI

The following series of experiments is designed to compare the discoloration resistance of the following polyurethane reaction mixtures:

(D) a polyurethane system from polyol, aromatic diisocyanate, and aromatic diamine;
(E) a polyurethane system from polyol, non-aromatic diisocyanate, and aromatic diamine;
(F) a polyurethane system from polyol, non-aromatic diisocyanate, and non-aromatic diamine.

After testing in a weatherometer for 100 hours, white stocks from (D) show a brown discoloration; white stocks from (E) show a beige discoloration; white stocks from (F) show negligible discoloration. The procedure for preparing the mixtures (D), (E) and (F) are set forth below.

(D) Aromatic diisocyanate—aromatic diamine

A prepolymer was prepared from one mole of tetramethylene adipate having a reactive number of 60, two moles of 80 ethylene, 20 propylene adipate having a reactive number of 60 and six moles of the 80/20 mixture of 2,4 and 2,6-tolylene diisocyanate. The prepolymer was diluted as follows:

| | Parts |
|---|---|
| Prepolymer | 1000 |
| Methyl ethyl ketone | 300 |
| Toluene | 300 |
| Cellulose acetate butyrate solution (10% CAB in Cellosolve acetate) | 50 |
| Total | 1650 |

To 500 parts of the diluted prepolymer was added 75 parts of titanium dioxide. This was ball-milled overnight to prepare a white diluted prepolymer.

A sheet was sprayed from the following recipe:

100 parts of white diluted prepolymer,
4.6 parts of 4,4'-methylene bis(2-chloroaniline) dissolved in 20 parts of methyl ethyl ketone.

The cured film showed 5600 pounds per square inch tensile and 520% elongation.

This white stock discolors badly in the weatherometer. After 100 hours in the weatherometer the sheet shows a brownish discoloration that makes it undesirable for many uses.

(E) Non-aromatic diisocyanate—aromatic diamine

Component A from Example I (500 parts) was treated with 75 parts of titanium dioxide and ball-milled 16 hours to prepare a white diluted prepolymer.

A recipe for spraying was prepared from 100 parts of this white diluted prepolymer and 3 parts of 4,4'-methylene dianiline in 20 parts of methyl ethyl ketone. The sprayed sheet showed 2100 pounds per square inch tensile and 600 percent elongation on room temperature cure.

After 100 hours in the weatherometer the white stock showed a beige discoloration. This could be considered barely borderline in color resistance.

(F) Non-aromatic diisocyanate—non-aromatic diamine

Component A (100 parts) was treated with a curative solution prepared by heating 2.2 parts of 1,4-cyclohexane bis methylamine and 20 parts of methyl ethyl ketone.

A sheet was sprayed which showed 5700 pounds per square inch tensile and 630% elongation.

The white sheet was submitted for the 100 hour weatherometer test. It showed negligible discoloration. This makes it satisfactory where discoloration is a problem. Also, it should be noted the tensile property is the equal of the highly discoloring polyurethanes made by recipe (E).

EXAMPLE VII

A prepolymer was made by reacting 500 parts of polytetramethylene ether glycol of about 1340 molecular weight with 204 parts of 4,4'-diisocyanato dicyclohexyl methane until the resulting product had isocyanate analysis of 4.5%.

A solution of the above prepolymer was made by dissolving 100 parts of the prepolymer in a mixture of 20 parts toluene and 20 parts methyl ethyl ketone.

This solution of prepolymer (50 parts) was mixed with 11.5 parts of a curative and then sheets were drawn down with the mixture on a polyethylene slab. The sheets were allowed to air dry at about 70–80° F. This clear film showed negligible discoloration after 100 hours in the Fade-Ometer.

The curative used was prepared by heating a mixture of 20 parts of 1,4-cyclohexane-bis(methylamine) and 80 parts of methyl ethyl ketone at 160° F. for 10 minutes. If the curative is not heated the pot life or work time is very short and a two-component spray system should be used, but if the curative is heated with the methyl ethyl ketone, then the pot life is about 8 minutes.

EXAMPLE VIII

A mixture of ethylene glycol and propylene glycol was reacted with adipic acid to give a polyester containing 80% ethylene and 20% propylene adipate having a reactive number of 62 and an acid number less than about 5.

This anhydrous 80 ethylene 20 propylene adipate (500 parts) was added to 90 parts of hexamethylene diisocyanate and after 10 minutes the temperature had risen to 115° C. The mixture was allowed to react for an additional 90 minutes at about 105° C. to give a prepolymer having free isocyanate group analysis of 3.8%.

This prepolymer (100 parts) was diluted with 30 parts of methyl ethyl ketone, 30 parts toluene and 5 parts of a 10% solution of cellulose acetate butyrate in Cellosolve acetate.

The diluted prepolymer (30 parts) was mixed with 3.9 parts of a curative formed by heating 20 parts of 1,4-cyclohexane-bis-(methylamine) with 80 parts of methyl ethyl ketone. A film was drawn down on a polyethylene slab and allowed to cure by standing for 36 hours at about 20° C. The film showed negligible discoloration after 100 hours in a weatherometer test. The film had a tensile of 4300 pounds per square inch and 630% elongation.

EXAMPLE IX

A curative was prepared by heating a mixture of 40 parts of anhydrous 1,6-hexylene diamine and 160 parts of methyl ethyl ketone under reflux condenser for 20 to 30 minutes at 65° C.

This curative (7 parts) was mixed with 50 parts of the diluted prepolymer of Example I and then two films were formed by pouring the mixture on polyethylene slabs and drawing the film down to the desired thickness. The films were tack free on standing at about 20° C. for 25 minutes. The film was clear and showed negligible discoloration after exposure in a weatherometer for 100 hours. The cured polyurethane had a tensile of 3580 pounds per square inch and a 660 percent elongation.

EXAMPLE X

A prepolymer prepared by reacting 500 parts of poly (tetramethylene ether) glycol and 204 parts of methylene bis-4,4'-cyclohexyl isocyanate to give a prepolymer having an analysis of 4.5% free isocyanato groups. This prepolymer (100 parts) was diluted with 20 parts methyl ethyl ketone and 20 parts toluene to give a diluted prepolymer.

A curative was made by heating a mixture of 20 parts bis-1,4-methylamino-cyclohexane in 80 parts of methyl ethyl ketone at 70° C. for 10 minutes. Then this curative (11.5 parts) was mixed with 50 parts of the diluted prepolymer to give a spreadable polyurethane reaction mixture which was used immediately to draw down sheets on a polyethylene slab. The clear sheets showed negligible discoloration after 100 hours in the weatherometer.

EXAMPLE XI

A commercial hydrogenated polybutadiene polyol of about 3400 molecular weight (17.1 parts) was dissolved in 15 parts of p-xylene and then 2.9 parts of 4,4'-methylene-bis-(cyclohexyl isocyanate) dissolved in 2.0 parts of p-xylene was added thereto and allowed to react at 75° C. for one hour to form a prepolymer. The prepolymer was dissolved in a mixture of methyl ethyl ketone and toluene to form a diluted prepolymer. Then to all the diluted prepolymer 4.3 parts of the curative solution from Example X was added. A film was drawn down on a polyethylene slab and air cured at 20° C. The clear film was postcured at 80° C. for 2 hours and then exposed for 100 hours in the weatherometer with only negligible discoloration.

Similarly, a commercial polybutadiene polyol may be used instead of the hydrogenated polybutadiene polyol except it will be necessary to use 1 to 5% of a noncoloring antioxidant suitable for use with the high cis-polyisoprene rubbers to stabilize the ethylenic double bonds.

Also, the polycarbonate polyols such as the reaction product of a phosgenated ethylene glycol with an excess of propylene glycol may be used instead of the polyester polyols or the polyether polyols.

EXAMPLE XII

Fifty parts of the diluted prepolymer of Example I was mixed with 3.3 parts of a curative prepared by permitting 20 parts of ethylene diamine to be mixed with 80 parts of methyl ethyl ketone to stand for 16 hours at room temperature. Then the resulting mixture was used to draw down a film on a polyethylene slab. The films were let standing at room temperature overnight and then subjected to exposure in a weatherometer for 100 hours. The exposed film had negligible discoloration.

EXAMPLE XIII

The reaction mixture of Example I was made by mixing the diluted prepolymer and the curative and then immediately the resulting mixture was extruded downward from a filament extruding head to form a continuous filament upon evaporation of the solvent.

Alternatively, thread or continuous filament may be produced by cutting the filament from a large sheet of film.

Other aliphatic diamines such as those having 3 to 20 carbon atoms may be used instead of ethylene diamine but it should be borne in mind that some of the lower diamines, i.e. those of 4 and 5 carbon atoms, have distasteful odors.

Other inert solvents than the hydrocarbons boiling below about 260° C. may be used, for example, the other solvents normally used in making paints such as nitropropane, ethyl formate, alkyl formate, alkyl acetate, ethyl acetate, ketones other than those previously listed, and the chlorinated hydrocarbons boiling below about 260° C. Usually the solvent is used in as little as 5 to 20 parts to as much as 70 to 100 parts per hundred parts of prepolymer.

While certain representative embodiments and details have been shown for the purpose of illustrating the invention, it will be apparent to those skilled in this art that various changes and modifications may be made therein without departing from the spirit or scope of the invention.

What is claimed is:

1. A method of prolonging the spreadability of a reaction mixture of organic diisocyanate and an organic diamine that develops a turbidity according to the Muller hot methylene chloride test of U.S. Pat. 2,620,516 in less than 30 seconds, comprising forming a prepolymer by reacting a mol of reactive hydrogen containing material having a molecular weight of at least 500 and no more than about 6000 selected from the class consisting of polyester polyol, polyether polyol, polyether-ester polyol, polydiene polyol, polycarbonate polyol and hydrogenated polydiene polyol with about 1.3 to 3 mols of an organic polyisocyanate having all its isocyanate groups attached to carbon atoms other than those that are benzenoid carbon atoms and then mixing the prepolymer with a solution of 0.7 to 1 mol of a primary diamine selected from the class consisting of cycloaliphatic diamine and an aliphatic diamine having the formula $$H_2N-(CH_2)_n-NH_2$$

where $n$ is 2 to 20 dissolved in a ketone selected from the class consisting of acetone and methyl ethyl ketone, said mixture being permitted to stand at ambient temperature for at least about 16 hours or being heated prior to being added to the prepolymer.

2. The method of claim 1 wherein the ketone and diamine are heated prior to being added to the prepolymer.

References Cited

UNITED STATES PATENTS

| | | | |
|---|---|---|---|
| 3,420,800 | 1/1969 | Haggis | 260—75 NH |
| 3,415,790 | 12/1968 | Davis | 260—75 NH |
| 3,401,137 | 9/1968 | Finelli | 260—75 NH |
| 3,386,942 | 6/1968 | Bell | 260—75 NH |
| 2,620,516 | 12/1952 | Müller | 260—75 NH |
| 3,645,907 | 2/1972 | Jackson | 260—77.5 AM |
| 3,574,127 | 4/1971 | Scheibelhoffer | 260—77.5 NH |
| 3,463,748 | 8/1969 | Scheibelhoffer | 260—75 NH |
| 3,401,143 | 9/1968 | Finelli | 260—75 NH |
| 3,617,367 | 11/1971 | Cummings | 260—77.5 CH |
| 3,598,748 | 8/1971 | Hirosawa | 260—77.5 AM |
| 3,595,839 | 7/1971 | Stokes | 260—77.5 CH |
| 3,567,692 | 3/1971 | Haggis | 260—75 NH |
| 3,523,925 | 8/1970 | Kamal | 260—77.5 CH |
| 3,440,087 | 4/1969 | Kamal | 260—77.5 CH |
| 3,267,078 | 8/1966 | Damusius | 260—75 NH |

FOREIGN PATENTS

| | | | |
|---|---|---|---|
| 1,051,332 | 12/1966 | Great Britain | 260—77.5 AM |

OTHER REFERENCES

Sampson et al., "Effect of Amine Structure on the Properties of Cured Polyurethane; Rubber Age; vol. 89; No. 2; May 1961, pp. 263–268.

Di Pinto, "Working Life of Adiprene L/MOCA Compounds in Solvent Soln." Adiprene Bulletin A-27981, DuPont, Oct. 17, 1962; pp. 1–5.

DONALD E. CZAJA, Primary Examiner

C. W. IVY, Assistant Examiner

U.S. Cl. X.R.

260— 75 NH, 77.5 AM, 77.5 CH, 77.5 SD